(12) United States Patent
Keeney et al.

(10) Patent No.: US 7,460,265 B2
(45) Date of Patent: *Dec. 2, 2008

(54) APPARATUS AND METHODS FOR PRINTING A PRINT JOB OVER A NETWORK

(75) Inventors: Richard A. Keeney, Prior Lake, MN (US); Philip A. Lodwick, Richfield, MN (US); Loren Schoenzeit, Orono, MN (US); John Steinberg, Millbrae, CA (US); Ofer Tenenbaum, Napa, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/329,993

(22) Filed: Jan. 11, 2006

(65) Prior Publication Data
US 2006/0114508 A1    Jun. 1, 2006

Related U.S. Application Data

(63) Continuation of application No. 09/688,475, filed on Oct. 16, 2000, now Pat. No. 7,095,518.

(51) Int. Cl.
*G06F 15/00* (2006.01)
*G06F 3/12* (2006.01)
*G06K 1/00* (2006.01)
(52) U.S. Cl. .................................. 358/1.15; 358/1.13
(58) Field of Classification Search ............... 358/1.15, 358/1.13, 1.14, 1.18; 709/202
See application file for complete search history.

(56) References Cited

U.S. PATENT DOCUMENTS 5,287,194 A    2/1994    Lobiondo (Continued)

FOREIGN PATENT DOCUMENTS

DE    196 41 357    4/1998

(Continued)

OTHER PUBLICATIONS

PCT/US01/32228 Int'l Search Report in Related WO Case, Jan. 28, 2002, Keeney et al.

(Continued)

*Primary Examiner*—Douglas Q Tran
(74) *Attorney, Agent, or Firm*—Michael A. Glenn; Glenn Patent Group

(57) ABSTRACT

The present invention relates to methods and apparatus for printing print jobs over a communications network. In particular, the present invention enables a user to obtain print jobs at a location which may be unspecified, and which may be remote from the source of the print job. A spooling server is used to store a print job received via the network from a print job source. A printer polling device, which may be used at a location remote from the client device, is capable of polling the spooling server via the network to identify whether any print jobs associated with the printer polling device are available for printing at a printer currently associated with the polling device. The spooling server need not initiate contact with the printer through a firewall, since it is polled by the printer polling device. Thus, network security is maintained.

20 Claims, 11 Drawing Sheets

U.S. PATENT DOCUMENTS

| | | | |
|---|---|---|---|
| 5,450,571 A | 9/1995 | Rosekrans et al. |
| 5,559,933 A | 9/1996 | Boswell |
| 5,625,757 A | 4/1997 | Kageyama |
| 5,633,932 A | 5/1997 | Davis et al. |
| 5,727,135 A | 3/1998 | Webb et al. |
| 5,727,156 A | 3/1998 | Herr-Hoyman |
| 5,799,206 A | 8/1998 | Kitagawa |
| 5,802,260 A | 9/1998 | Shimakawa |
| 5,881,213 A | 3/1999 | Shaw et al. |
| 5,898,823 A | 4/1999 | Sorkin |
| 5,978,560 A | 11/1999 | Tan et al. |
| 5,982,994 A | 11/1999 | Mori et al. |
| 5,987,224 A | 11/1999 | Koakutsu et al. |
| 5,995,723 A | 11/1999 | Sperry |
| 6,003,069 A | 12/1999 | Cavill |
| 6,006,281 A | 12/1999 | Edmunds |
| 6,012,083 A * | 1/2000 | Savitzky et al. | 709/202 |
| 6,043,898 A | 3/2000 | Jacobs |
| 6,043,909 A | 3/2000 | Holub |
| 6,094,679 A | 7/2000 | Teng et al. |
| 6,125,372 A | 9/2000 | White |
| 6,240,456 B1 | 5/2001 | Teng et al. |
| 6,288,790 B1 | 9/2001 | Yellepeddy et al. |
| 6,298,445 B1 | 10/2001 | Shostack et al. |
| 6,307,640 B1 | 10/2001 | Motegi |
| 6,327,045 B1 | 12/2001 | Teng et al. |
| 6,337,745 B1 | 1/2002 | Aiello, Jr. et al. |
| 6,351,317 B1 | 2/2002 | Sasaki et al. |
| 6,378,070 B1 | 4/2002 | Chan et al. |
| 6,405,178 B1 | 6/2002 | Manchala et al. |
| 6,449,663 B1 | 9/2002 | Carney et al. |
| 6,452,691 B1 | 9/2002 | Marshall |
| 6,466,328 B1 | 10/2002 | Bradley et al. |
| 6,490,052 B1 | 12/2002 | Yanagidaira |
| 6,615,234 B1 | 9/2003 | Adamske et al. |
| 6,623,527 B1 | 9/2003 | Hamzy |
| 6,711,677 B1 | 3/2004 | Wiegley |
| 2001/0037462 A1 | 11/2001 | Bengtson |
| 2002/0145748 A1 | 10/2002 | Nonoyama et al. |

FOREIGN PATENT DOCUMENTS

| | | |
|---|---|---|
| EP | 0 598 513 | 5/1994 |
| EP | 0 910 203 | 4/1999 |
| EP | 0 952 513 | 10/1999 |
| EP | 0 974 892 | 1/2000 |
| EP | 1 026 576 | 8/2000 |
| JP | 2000155733 | 6/2000 |

OTHER PUBLICATIONS

PCT/US01/32228 Int'l Search Report in Related WO Case, Oct. 24, 2002, Keeney et al.
PCT/US01/32228 Int'l Prelim Exam Report in Related WO Case, Feb. 27, 2003, Keeney et al.
AU 2002213250 Examination Report in Related AU case, Jul. 11, 2006, Keeney et al.
Web Pages from hpwire.com web site, including white paper entitled"HP Wire: Enabling E-Printing Solutions For The Enterprise," by Lim Chuin Kiat and Wilson Wong (undated), printed from the web site on Jan. 16, 2001, (8 pages total).
PrinterOn Corporation Products and Solutions white paper, by Patrick Pidduck, Jul. 27, 2000, (13 pages).
Web page from Kinkos.com web site, printed from the web site on Jan. 16, 2001 (1 page).
Web pages from weborder.kinkos.com web site, printed from the web site on Jan. 16, 2001 (4 pages).

* cited by examiner

FLOW DIAGRAM OF A PRINT JOB AND TARGET PRINTER FORMATTER.

APPARATUS AND METHODS FOR PRINTING A PRINT JOB OVER A NETWORK

REFERENCE TO RELATED APPLICATIONS

This application is a continuation of U.S. application Ser. No. 09/688,475, filed 16 Oct. 2000, now U.S. Pat. No. 7,095,518.

BACKGROUND

The present invention relates to methods and apparatus for printing print jobs over a communications network. In particular, the present invention enables a user to obtain print jobs at a location which may be unspecified, and which may be remote from the source of the print job. A spooling server is used to store a print job received via the network from a print job source. A printer polling device, which may be used at a location remote from the client device, is capable of polling the spooling server via the network to identify whether any print jobs associated with the printer polling device are available for printing at one or more printers associated with the polling device.

As computer networks become more complex, the rate at which network configurations change continues to increase. Also, the increasingly frantic pace of the typical business traveler who juggles documents on multiple computers and is required to configure a traveling laptop computer to integrate into various changing networks makes it increasingly difficult to reliably and efficiently print even a simple document.

For example, a business traveler in a hotel may wish to print to a printer that the hotel provides for such purposes. Under the current state of the art, the user must first obtain the network ID of the printer along with some information about the type of printer. Then, a print driver for that specific printer must be installed on the user's computer, and the computer must be configured to connect to the printer. This may additionally involve configuring the computer to connect to the host network.

Further, in many cases, it is desirable to be able to prepare a document for printing prior to having the information concerning the destination printer. For example, it may be desirable to print a document from a mobile laptop connected via a wireless data connection while in transit to a meeting at a site the user has never visited before. Obtaining the information and configuring the laptop to be able to print to the printer becomes logistically infeasible.

These problems have typically been solved in the past by one of the following methods:
1. The document is e-mailed or otherwise transferred over a network to a computer already configured to print to the desired printer;
2. A portable computer is connected directly to the printer via a cable or infra-red, bypassing many of the difficulties of configuring the computer to print to a network computer;
3. A portable printer is transported to the desired location; or
4. The document is faxed to a fax machine.

Printing methods relating to network and distributed printing are known in the prior art. Such systems require either a private network or foreknowledge of the destination of a print job. These prior art methods comprise what is typically referred to as "push" technology (i.e., technology in which a print job is directed to a specific known destination or printer).

In addition to the need for efficiency and ease of use is the need for security when sending, storing, or printing print jobs. Early in the life of the Internet, the need for securing an organization's local network from tampering, stealing, or vandalism by outsiders became very obvious. A type of gateway called a firewall was developed to meet this need. The firewall is designed to be a single, well-controlled access point between the outside, global, or wide-area network and the inside, local-area network. By carefully restricting the types of network traffic and the destinations where that traffic can flow, the firewall can provide effective protection.

Specific "holes" in the firewall are created for each type of traffic that is allowed through the gateway in each direction. Most organizations, for example, allow e-mail traffic in and out from their e-mail server, as well as web page client access from inside the firewall to servers located outside of it.

Many types of access between machines commonly used on a local network are normally prevented from going through the firewall. Specifically, file sharing, remote log-in, printing, and various other network-administration types of protocols are typically not allowed to be transported outside the firewall.

Another aspect of the firewall is that it is almost always administratively controlled by a centralized authority for the organization that owns the local area network—commonly the management information services (MIS) department of a company. Normal users generally have to make special requests that are approved at the upper levels of management to get configuration changes in the firewall. In the interest of maintaining security, these changes are often limited to specific point-to-point exceptions or "holes" in the firewall.

It is desirable by many users to be able to print from a machine on one local area network to a printer located on a different local area network with the data being transferred over a global network (e.g., the Internet) outside of the firewall of both local networks.

The current state of the art has solutions for this problem. However, almost all of these solutions require the intervention of the firewall administrator.

One example of a solution is the IPP—Internet Printing Protocol standard being promulgated by various vendors. This standard allows IPP-equipped printers to receive print jobs from remote clients over the Internet. However, the installation and use of IPP requires that a specific IPP hole be opened in the firewall by the network administrator.

It would be advantageous to be able to provide methods and apparatus that allow a user to print to a perhaps yet unknown destination printer or printer pool in a reliable, efficient and secure manner without the disadvantages of the above-mentioned techniques.

It would be further advantageous to provide a printing system based on "pull" technology (i.e., technology which enables a print job to be printed upon request, where the print file is only delivered in response to the request). Such technology would enable a system that allows a user to print to a destination printer or printer pool that may be located anywhere, in a reliable, efficient, and secure manner without the disadvantages of the above-mentioned techniques.

It would be further advantageous to have a solution that allows secure, efficient and easy-to-configure inter-network printing through a gateway firewall without the intervention of the network administrator.

SUMMARY

This invention relates to methods and apparatus for printing print jobs over a communications network. In particular, this invention enables a user to obtain print jobs at a location which may be unspecified, and which may be remote from the source of the print job. A spooling server is used to store a print job received via the network from a print job source. A printer polling device, which may be used at a location remote from the source of the print job, is capable of polling the spooling server via the network to identify whether any print jobs associated with the printer polling device are available for printing at one or more printers associated with the polling device.

In an illustrative embodiment, a spooling server is provided which is capable of receiving, storing and forwarding one or more print jobs over a network. The print job is forwarded over the network to the spooling server (e.g., from any suitable print job source). The spooling server receives the print job (e.g., at a receiver) and stores the print job in memory. The spooling server receives a polling request over the network for a print job from a printer polling device. The spooling server forwards the requested print job to the printer polling device (e.g., via a transmitter).

The print job can originate from any suitable print job source, such as a client device with an associated print driver, a web browser, a facsimile machine, a scanner, a telephone, an Internet appliance, a personal digital assistant, or the like. A print job can also originate on the spooling server itself or be obtained from another server. The client device may be a computer, a telephone, a personal digital assistant, an Internet appliance, or the like.

The identified print job can be transmitted from the spooling server to the printer polling device and printed at one or more printers coupled to the printer polling device. The printer may be located at a location remote from said spooling server.

The printer polling device may periodically poll the spooling server to identify a print job associated with the printer polling device.

The network may comprise at least one of a local area network, a wide area network, a global network, the Internet, and any other type of network. The network may consist of multiple interconnected networks having multiple gateways and other features as is well known in the art.

In an alternate embodiment, the printer polling device may be located within a gateway firewall and the spooling server may be located outside the gateway firewall. The print job may be forwarded to the spooling server such that reconfiguration of the gateway firewall is not required. For example, the print job may be forwarded to the spooling server as web-style traffic and received at the printer polling device as web-style traffic.

A print job source may be located at and in communication with a first local area network for forwarding of the print job to the spooling server. The printer polling device may be located at and in communication with a second local area network. The spooling server may be located outside of the first and second local area networks. The print job source may communicate with the spooling server via a first gateway firewall which controls access to the first local area network and the printer polling device may communicate with the spooling server via a second gateway firewall which controls access to the second local area network.

The spooling server may store multiple print jobs in at least one spooling queue.

The print job may be encrypted at the print job source and decrypted at the printer polling device.

The print job may comprise a document provided by a content provider. The content provider may be one of a newspaper, a magazine, a periodical, a document provider, a graphic arts provider, a notification service, an Internet content provider, a merchant, a financial institution, a government agency, a shipping company, or the like.

In a preferred embodiment, a fee may be charged for access to the spooling server. The print job may be provided by the content provider on a subscription basis. A single print job may be provided by the content provider for printing by multiple users.

In a further embodiment, each print job may be stored on the spooling server according to a personal identification number (PIN). The spooling server may communicate to the printer polling device a list of print jobs associated with the PIN which are stored at the spooling server. The selection of a print job from the list may be provided for (e.g., via a user interface).

A plurality of print jobs may be stored on the spooling server according to the PIN. The PIN may be provided to the spooling server via one of a user interface associated with the printer polling device, a telephone, a computer, an Internet appliance, a facsimile machine, a scanner, a personal digital assistant device, a dedicated terminal, or the like. The list of available print jobs may be displayed on one of a user interface associated with the printer polling device, a telephone, a computer, an Internet appliance, a facsimile machine, a scanner, a personal digital assistant device, a dedicated terminal, or the like. Selection of an available print job may be made via a user interface associated with the printer polling device, a telephone, a computer, an Internet appliance, a facsimile machine, a scanner, a personal digital assistant device, a dedicated terminal, or the like.

In a further embodiment, the print job may be provided to the spooling server without a pre-determined print destination. Alternatively, a desired print location for the print job may be designated at the print job source. The designated print location may be communicated to the spooling server with the print job. The print job may be printed at the desired print location when the printer polling device at the desired print location polls the spooling server and identifies the print job.

Further, a substantially specific time for printing a print job may be designated such that the print job is only available for printing from the spooling server at the designated substantially specific time.

In addition, a lifetime of the print job may be designated, wherein said print job will be stored on the spooling server only for the designated lifetime.

A number of printings of the print job may be designated, wherein the print job can only be printed the designated number of times.

A list of recipients authorized to retrieve a print job may be designated, wherein the print job may only be printed by the designated recipients.

The print job may be one of a negotiable instrument, a stamp, a coupon, a certificate, a check, a unit of currency, a token, a receipt, or the like.

In a preferred embodiment, the printer polling device is capable of communicating printer status to the spooling server. The printer status may comprise at least one of a printer ready indication, an on-line indication, toner level information, paper supply information, error information, or other appropriate status information.

A printer operator can be notified when the printer status indicates that a printer requires attention. The operator can also be provided with vendor contact information to facilitate obtaining printer supplies or service. Automatic on-line ordering of printer supplies as required by printer status can be provided (e.g., by the spooling sever contacting predetermined preferred vendors).

The print job may include at least one of a document, a poster, an image, a coupon, a ticket, a certificate, a check, a list, a schedule, a periodical, a unit of currency, a negotiable instrument, postage, a bill of lading, a lottery or gaming ticket, a token, food stamps, a license, a permit, a pass, a passport, a ballot, a citation, identification, a copy-protection key, a proof-of-purchase, a warranty, a receipt, a transcript, a library card, or any other printable subject matter.

In an alternate embodiment, an agent program provides a directory of documents to the spooling server. The agent program enables a client device associated with the print job source to poll the spooling server to determine whether the spooling server requires a document identified in the directory to complete a print job. If so, the document can be uploaded from the client device to the spooling server.

The directory can be communicated to the printer polling device and presented at the printer polling device. Selection of a print job from the directory can be made (e.g., via a user interface).

The directory may be presented via a visual presentation or an audio presentation. The client device may periodically poll the spooling server to determine whether the spooling server requires a document identified in the directory to complete a print job.

Communications with the spooling server may be enabled via at least one of a telephone, a personal digital assistant device, a computer, an Internet appliance, a web browser, a dedicated terminal, or the like. The communications with the spooling server may be via an audio interface or a visual interface.

A communication device for providing status of the print job stored on the spooling server may be provided. The status of the print job may comprise at least one of filename, file size, author, creation date, print job lifetime, image, title, contents, personal identification number, recipient, job number, or reference number. The communication device may be a telephone, a computer, an Internet appliance, a personal digital assistant device, a dedicated terminal, or any other suitable wireless or wired communication device.

The print job source may be one of a computer, a personal digital assistant device, an Internet appliance, a facsimile machine, a scanner, a telephone, a dedicated terminal, or other suitable source.

The printer polling device may be capable of polling multiple spooling servers.

The spooling server may be capable of communicating with other servers and receiving a print job from at least one of the other servers.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The present invention enables print jobs to be sent to a spooling server for storage. The print jobs are subsequently delivered to one or more printers, on request, via a printer polling device. The printer polling device uses "pull" technology, which polls the spooling server so that the spooling server does not have to initiate a connection into a printer. In this manner print jobs can be securely printed anywhere, either automatically or at the request of a user who is authorized by the printer polling device and/or the spooling server. Since the spooling server need not initiate contact with any device, there is no potential breach of firewall security in a local network environment.

In one embodiment, a portable printer polling device is provided to enable retrieval and printing of documents from any location having Internet access and a printer. The spooling server functions as a repository that is accessible, e.g., via a global communication network such as the Internet, to authorized users at any time of day. Since the printer polling device polls the spooling server in order to obtain delivery of a print job, prior art push data flow techniques, which could compromise a local area network's security, are avoided. Moreover, compatibility with virtually all printers that may be connected to the network is provided, so that a document can be printed anywhere regardless of a specific printer's requirements. Many other advantages and features of the invention are set forth in the following description.

Figure 1:
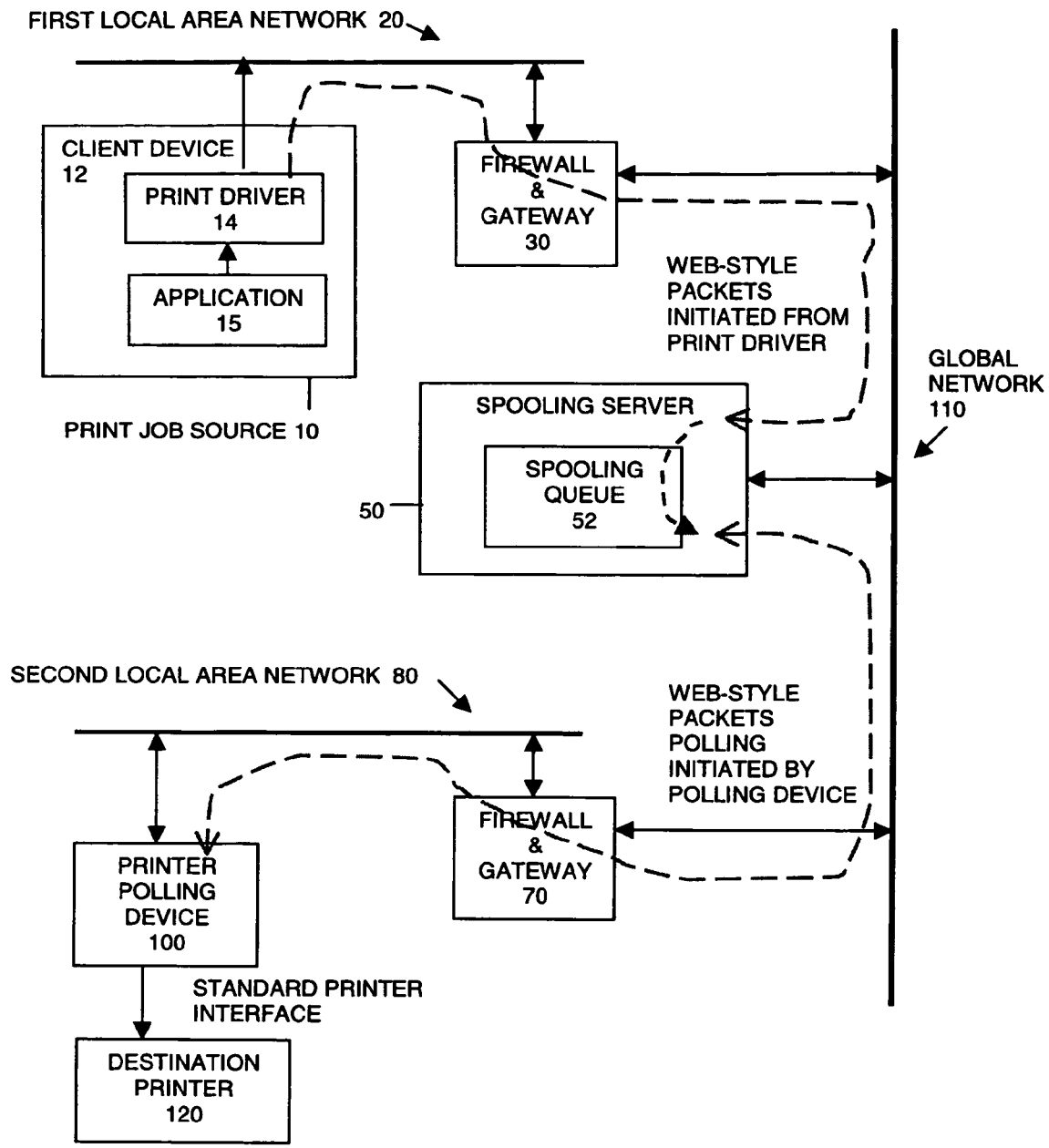
FIG. 1 is a block diagram of an implementation of the present invention.

A preferred embodiment of the invention is shown in FIG. 1. Printing services are provided via a spooling server 50 which is capable of receiving and storing one or more print jobs from a print job source 10 via a network 110. A printer polling device 100 is provided which is capable of polling the spooling server 50 via the network 110 to identify a print job associated with the printer polling device 100. Configuration problems are eliminated as each print job source 10 only needs to be configured to know how to print to the spooling server 50. The spooling server 50 only needs to be configured to be able to print to the printer polling device 100.

The print job can originate from any suitable print job source 10. As shown in FIG. 1, the print job source 10 may be a client device 12 associated with print driver 14. The print driver 14 may receive the print job from an originating application 15, which can be any program capable of producing a printable document. The print job source 10 may also be a web browser, a facsimile machine, a scanner, a telephone, an Internet appliance, a personal digital assistant, or the like. A print job can also originate on the spooling server 50 itself or be obtained from another server. The client device 12 may be a computer, a telephone, a personal digital assistant, an Internet appliance, a facsimile machine, a scanner, or the like.

The identified print job can be transmitted from the spooling server 50 to the printer polling device 100 and printed at a printer 120 coupled to the printer polling device 100. Printer 120 may be a single printer or a pool of one or more printers coupled via a print server.

The printer polling device 100 may periodically poll the spooling server 50 to identify a print job associated with the printer polling device 100. Security is achieved by the fact that the printer 120 is not passively accepting any and all connections from the outside. The printer polling device 100 is initiating connections to a specific, trusted location, the spooling server 50.

The network 110 may comprise at least one of a local area network, a wide area network, a global network, the Internet, and any other type of network. The network 110 may consist of multiple interconnected networks having multiple gateways and other features as is well known in the art.

In an alternate embodiment, the printer polling device 100 may be located within a gateway firewall 70 and the spooling server may be located outside the gateway firewall 70. In addition, the print job source 10 may be located within a gateway firewall 30 and the spooling server may be located outside the gateway firewall 30.

The print job may be forwarded to and from the spooling server 50 such that reconfiguration of gateway firewalls 30 and 70 is not required. For example, the print job may be forwarded to the spooling server 50 as web-style traffic and received at the printer polling device 100 as web-style traffic. For example, a print driver 14 may accept print requests from application 15 like any other print driver, but instead of routing the print requests onto the network 110 using normal printer packets and well-known-ports, it routes the output of the print job to the spooling server 50 located outside of the firewall 30 using packets and ports that resemble web traffic.

Similarly, using web types of packets and ports, the printer polling device 100 is capable of polling the spooling server 50 and retrieving any print jobs that have been stored for the printer 120.

As shown in FIG. 1, the print job source 10 may be located at and in communication with a first local area network 20 and the printer polling device 100 may be located at and in communication with a second local area network 80. The spooling server 50 may be located outside of the first and second local area networks 20, 80. The print job source 10 may communicate with the spooling server 50 via a first gateway firewall 30 which controls access to the first local area network 20 and the printer polling device 100 may communicate with the spooling server 50 via a second gateway firewall 70 which controls access to the second local area network 80.

The printer polling device 100 may be: (i) a stand-alone device connected to the printer 120 via a standard printer port, (ii) integrated into the firmware of the printer 120, (iii) integrated into the software of a network print server, or (iv) of any other suitable configuration. The printer polling function may also be integrated into the software on a stand-alone print server such as those manufactured by Electronics for Imaging, Inc. (Foster City, Calif.) under the trademarks Fiery® and EDOX®.

In a preferred embodiment, a fee may be charged to access the spooling server 50. The fee can be based on one of print job size in bytes, print job size in number of pages, print job type, time for printing, time for storage, monthly fee, per use fee, lifetime membership, monthly membership, use of color, use of black and white, page size, location, convenience, number of images, print quality, image quality, or other suitable factors. The fee may be charged for providing a print job to the spooling server 50 and/or retrieving a print job from the spooling server 50. The fee can be paid via a client device 12 associated with the print job source 10, the printer polling device 100, or any other suitable device capable of communicating with the spooling server, such as a smart card, a telephone, a personal digital assistant, or the like.

The spooling server 50 may store the one or more print job(s) in at least one spooling queue 52. The spooling server 50 may be maintained by a trusted party on the outside of the firewalls 30, 70. Alternatively, the spooling server 50 may be owned and maintained by the organizations desiring to utilize inter-network printing.

Since the communications amongst the print job source 10, the spooling server 50, and the printer polling device 100 may travel across public networks, it is very desirable to protect any proprietary or confidential information that may be embodied in the print jobs.

In a preferred embodiment, the print job may be encrypted at the print job source 10 and decrypted at the printer polling device 100. For example, the print job can be encrypted on the client device 12 such that it can only be printed by a person with the correct decryption key. In addition, printing of the document can be delayed until the key is physically entered at the printer polling device 100 (e.g., the recipient is physically present at the printer 120).

Figure 2:
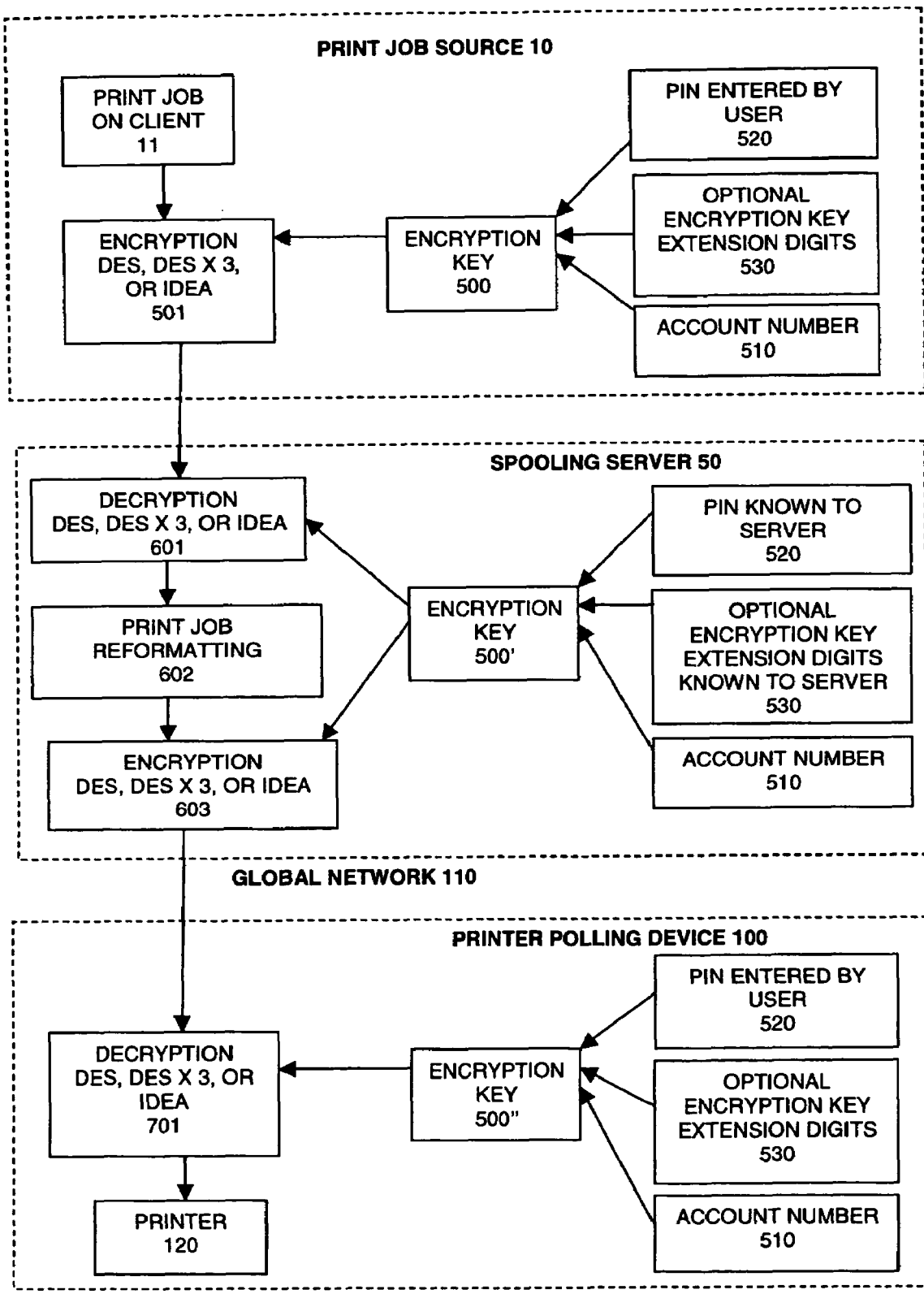
FIG. 2 is a flow diagram showing an example of an encryption process which can be implemented in accordance with the invention.

A flow diagram of an example of an encryption process used between the print job source 10, the spooling server 50 and the printer polling device 100 is shown in FIG. 2. The print job 11 is protected by encrypting the print job (indicated at 501) at the print job source 10 (e.g., on the print driver 14 or an agent program on the originating client device 12 of FIG. 1) and decrypting it at the spooling server 50. The encryption algorithm may be the IDEA algorithm. Other suitable encryption algorithms which can be utilized are DES (the Data Encryption Standard), or triple-DES (DES applied to the data three times with three different keys). Other encryption algorithms suitable for commercial confidential information are numerous and well known in the art of data encryption.

The key 500 used for encryption 501 may be derived from an account number 510, a user's secret PIN (personal identification number) 520, and/or optionally some additional encryption key digits 530 supplied by the user. Simply concatenating the bits together from these sources provides a moderately secure key 500. Optionally, additional security may be achieved by using a more sophisticated hashing function.

The key 500 would be known only to the user and to the secure, trusted, spooling web server 50. The encrypted print job is sent to the spooling server 50 where it is decrypted (601) to facilitate reformatting 602 for the destination printer once it is known. The reformatted print job data is re-encrypted 603 using the same or similar key 500' derived in the same manner as key 500 at the print job source 10. The encrypted print job is then transmitted from the spooling server 50 to the printer polling device 100. Once at the printer polling device 100, the print job is decrypted 701 using a key 500" derived from the PIN 520, account number 510, and/or optional encryption key extension digits 530. The decrypted print job can then be forwarded to the printer 120 for printing.

The print job 11 may comprise a document provided by a content provider. The content provider may be one of a newspaper, a magazine, a periodical, a document provider, a graphic arts provider, a notification service, an Internet content provider, a merchant, a financial institution, a government agency, a shipping company, or the like. For example, instead of physically delivering the daily sports page, it is simply printed on a customer's home printer.

The print job 11 may be provided by the content provider on a subscription basis. A single print job may be provided by the content provider for printing by multiple users.

Figure 3:
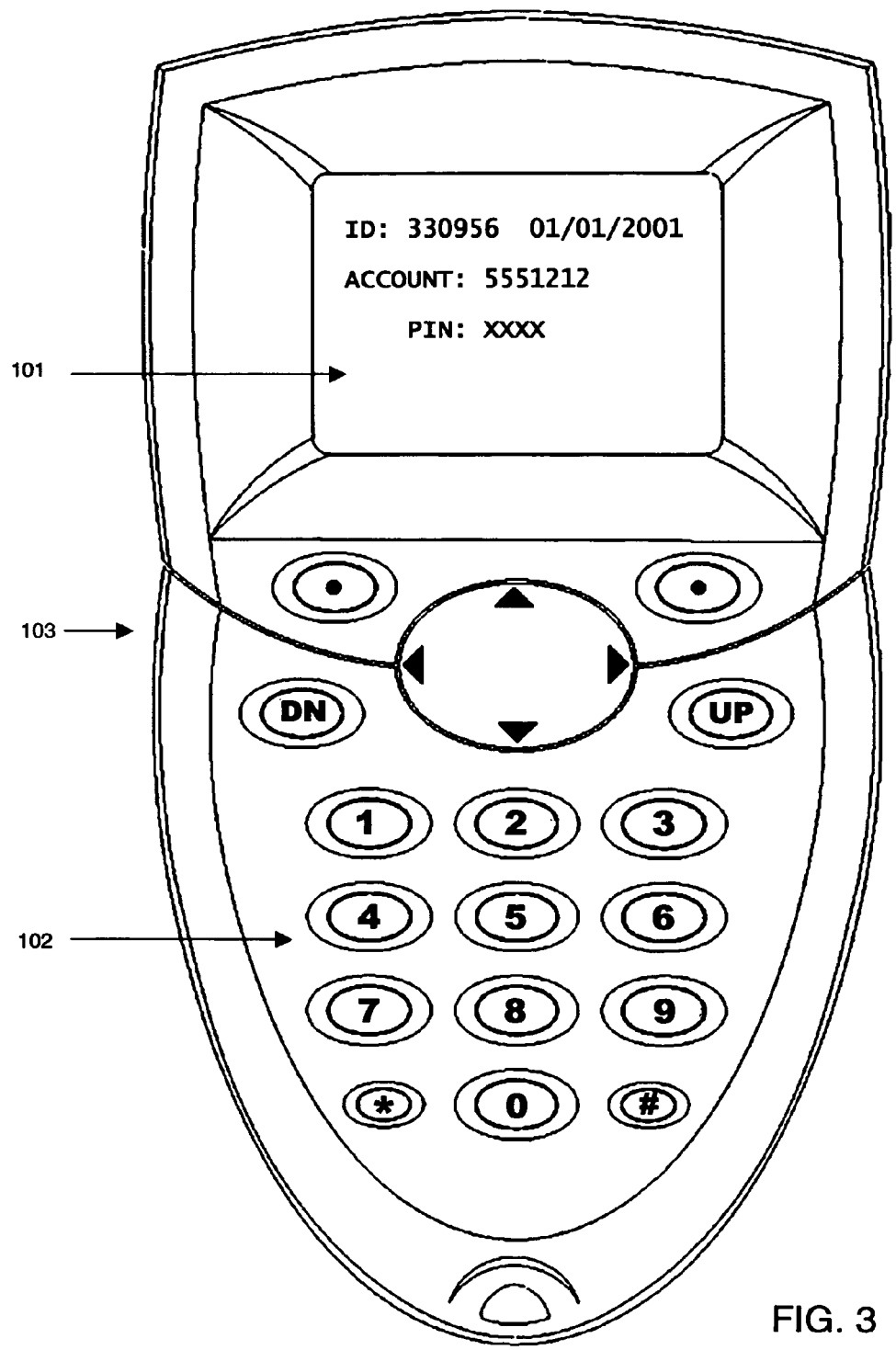
FIG. 3 shows a representation of a printer polling device.

The printer polling device 100 may comprise a user interface, a connection to the network 110, and a connection to the printer 120. FIG. 3 shows an embodiment of a user interface 103 for the printer polling device 100 having a display 101 and a keypad 102. The keypad 102 shown in FIG. 3 may also comprise an alphanumeric keypad to allow for entry of both letters and numbers. The user interface may optionally include a speaker and a microphone for audio output and input, and may also include a card reader for reading a magnetic strip on a credit or debit card, automated teller machine (ATM) card, smartcard, prepaid print card, or the like.

Figure 4:
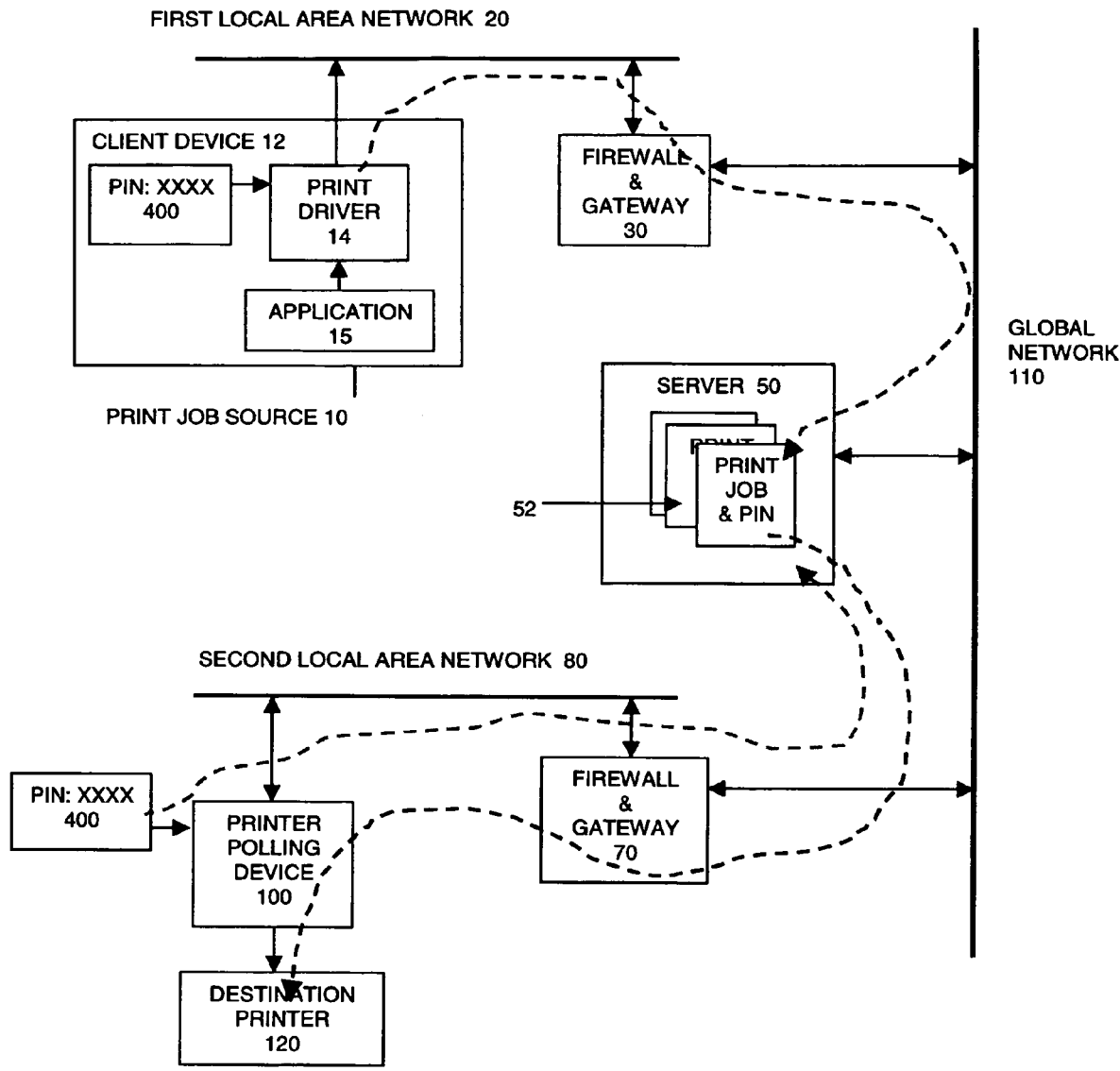
FIG. 4 is a block diagram of an alternate embodiment of the invention.

In a further embodiment as shown in FIG. 4, each print job may be stored on the spooling server 50 according to a personal identification number (PIN) 400. As an example, FIG. 4 shows the PIN 400 entered at a client device 12. The PIN 400 is forwarded to the spooling server 50 by the print driver 14 along with the print job. The spooling server 50 may communicate to the printer polling device 100 a list of print jobs associated with the PIN 400 which are stored at the spooling server 50. The selection of a print job from the list may be provided for (e.g., via a user interface). For example, a small terminal may be provided at each printer polling device 100 to allow a user to interact with the spooling server 50 and request that the user's print jobs be sent to the printer 120 at the user's location. The user may identify himself or herself at the printer polling device 100 with their PIN 400, and the spooling server 50 can then match that PIN 400 with print jobs previously submitted using that same PIN 400.

A plurality of print jobs may be stored on the spooling server 50 according to the PIN 400 (e.g., in spooling queue 52). For example, a directory may be created for each user, and thus each PIN, registered with the spooling server 50. Each print job may additionally be assigned a unique job number at the time it is first received at the spooling server 50. Thereafter, the job number may be used to access the data files associated with that job unambiguously. Once a print job has been selected to be printed to a destination printer 120, the job number for the print job may be entered into a queue associated with the destination printer 120. Data structures suitable for maintaining a queue are well known in the art. In the preferred embodiment, the queue 52 is maintained in a C++ class known as a CList provided by Microsoft in their C++ class library.

When the printer polling device 100 polls the spooling server 50, the spooling server 50 checks to see if the queue for that printer 120 contains any print jobs. When the spooling server 50 finds a print job waiting to be printed, the data for that print job is retrieved from the file system, reformatted in a form suitable for the identified printer 120, and transmitted to the printer polling device 100.

The PIN 400 may be provided to the spooling server 50 via one of a user interface associated with the printer polling device 100, a telephone, a computer, an Internet appliance, a facsimile machine, a scanner, a personal digital assistant device, a dedicated terminal, or the like. The list of available print jobs may be displayed on one of a user interface associated with the printer polling device 100, a telephone, a computer, an Internet appliance, a facsimile machine, a scanner, a personal digital assistant device, a dedicated terminal, or the like. Selection of an available print job may be made via a user interface associated with the printer polling device 100, a telephone, a computer, an Internet appliance, a facsimile machine, a scanner, a personal digital assistant device, a dedicated terminal, or the like.

Figure 5:
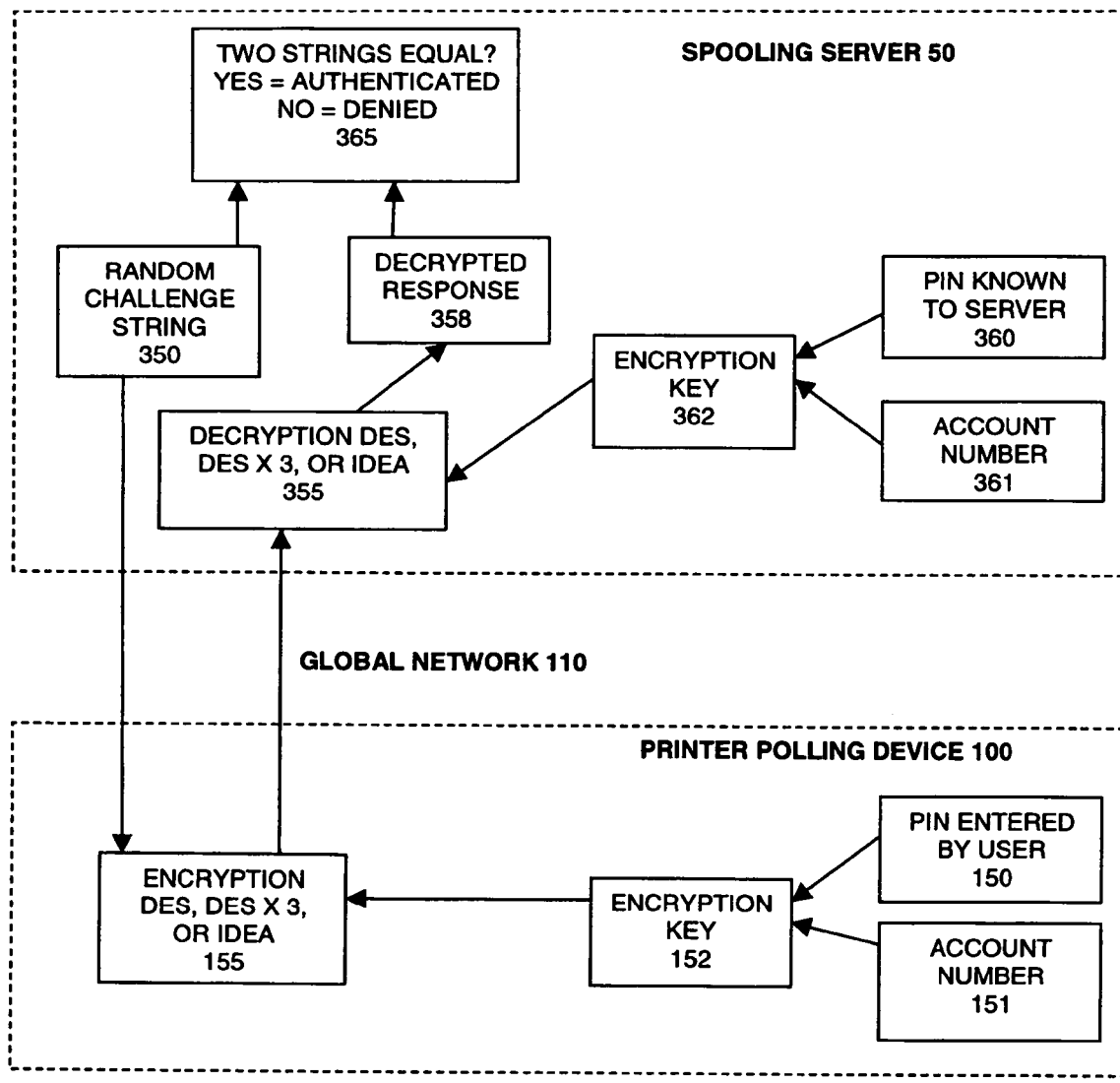
FIG. 5 is a flow diagram of an authentication procedure which can be implemented in accordance with the invention.

FIG. 5 illustrates an exemplary process of authentication of a user using a PIN. When a user desires to access their account or documents over a non-secure channel, first, the spooling server 50 needs to verify that it is indeed talking to the actual user. The server generates a random string of bits 350. These bits are sent to the printer polling device 100 where authentication is to take place. The user's PIN 150 is used to generate an encryption key 152 for encrypting the bits (indicated at 155) and the result is returned to the spooling server 50. The spooling server 50 decrypts the string (indicated at 355) using an encryption key 362 generated from the PIN it knows (360) and compares it to the original random string (indicated at 365). If the decrypted string 358 matches the original string 350, the spooling server 50 accepts the user as authenticated. An account number (361, 151) may optionally be used (either alone or in connection with the PIN) to generate the encryption keys 362, 152. Many other authentication protocols are well known in the art and may be substituted for the protocol described above in connection with FIG. 5.

The printer polling device 100 may be a portable device. The printer polling device 100 may be operably associated with a variety of printer types.

In a further embodiment, the print job may be provided to the spooling server 50 without a pre-determined print destination. A user is able to interact with the printer polling device 100 and communicate the identification of the desired print destination for the user's print job to the spooling server 50. The user need not know anything more about the printer 120 than its location (which the user needs anyway to be able to retrieve the physical output pages).

Alternatively, a desired print location for the print job may be designated at the print job source 10. The designated print location may be communicated to the spooling server 50 with the print job. The print job may be printed at the desired print location when the printer polling device 100 at the desired print location polls the spooling server 50 and identifies the print job.

Further, a substantially specific time for printing a print job may be designated such that the print job is only available for printing from the spooling server 50 at the designated substantially specific time.

In addition, a lifetime of the print job may be designated, wherein said print job will be stored on the spooling server 50 only for the designated lifetime.

A number of printings of the print job may be designated, wherein the print job can only be printed from the spooling server 50 the designated number of times.

A list of recipients authorized to retrieve a print job may be designated, wherein the print job may only be printed by the designated recipients. For example, a document or series of documents may be provided to the spooling server 50 which document or documents can be received by a designated group of recipients, such as a company's sales force, newsgroup or other content subscribers, or other target audiences.

The print job may be one of a negotiable instrument, a stamp, a coupon, a certificate, a check, a unit of currency, a token, a receipt, or the like. In such circumstances, it may be desirable that the designated number of printings is one.

The print job source 10 may be connected to the network 110 using Dynamic Host Configuration Protocol (DHCP protocol), or any other suitable network configuration protocol. Similarly, the printer polling device 100 may be connected to the network 110 using DHCP protocol, or any other suitable network configuration protocol.

DHCP is a protocol which allows nodes to be added to a TCP/IP network dynamically without specific prior configuration of that node in the domain controller's hosts database. Each node desiring to connect announces itself to the DHCP server. The name of the node is sent to the DHCP server. The DHCP server then assigns the node a dynamic IP address as well as communicating the IP addresses of other key network services such as name servers, mailhosts, and gateways that are available. Once setup and enabled, this mechanism allows nodes to be added to the network without the intervention of a network administrator.

Ease of installation and configuration is therefore achieved through the use of DHCP by the fact that most local networks are configured to allow network devices to be added without the intervention of an administrator using DHCP. In addition, most local networks allow web access through their firewall (e.g., gateway firewalls 30 and 70). These two factors allow both the print job source 10 and the printer polling device 100 to connect and communicate to the spooling server 50 without the intervention of a network administrator. The user simply plugs in the printer polling device 100 and it accesses the network and starts polling the spooling server 50.

The invention may also be implemented using a virtual private network (VPN). A VPN is a mechanism that allows network nodes not directly connected to a local private network to behave as if they are locally connected to the network by forwarding the data packets through some type of public or intermediate network. For security, authentication of the node desiring to connect to the network is performed, as well as encryption of the contents of the forwarded packets. Various commercial products allow the setup and configuration of a VPN through various connectivity mechanisms such as dial-up ISP's, Cable Modems, and DSL on the client node end. The local network that is being connected to will require a router or router/firewall that implements the VPN protocol to allow the VPN connection. A VPN is made up of two components: L2TP (Layer 2 tunneling protocol) and IPSEC (Internet Protocol Security).

In a preferred embodiment, the printer polling device 100 is capable of communicating the status of the printer 120 to the spooling server 50. The printer status may comprise at least one of a printer ready indication, an on-line indication, toner level information, paper supply information, error information, or other appropriate status information.

A printer operator can be notified when the printer status indicates that the printer 120 requires attention. The operator can also be provided with vendor contact information to facilitate obtaining printer supplies or service. Automatic on-line ordering of printer supplies as required by printer status can be provided (e.g., by the spooling sever 50 contacting predetermined preferred vendors).

The print job may include at least one of a document, a poster, an image, a coupon, a ticket, a certificate, a check, a list, a schedule, a periodical, a unit of currency, a negotiable instrument, postage, a bill of lading, a lottery or gaming ticket, a token, food stamps, a license, a permit, a pass, a passport, a ballot, a citation, identification, a copy-protection key, a proof-of-purchase, a warranty, a receipt, a transcript, a library card, or any other printable subject matter.

Figure 6:
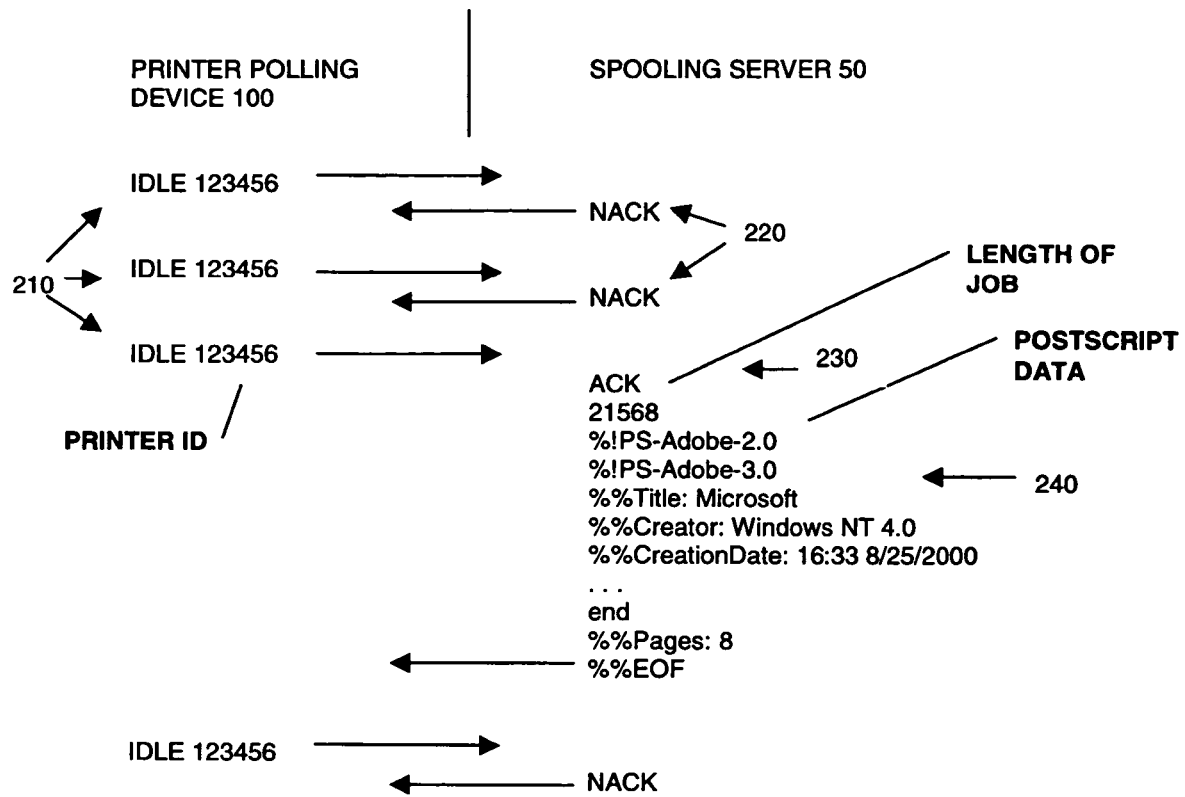
FIG. 6 shows an example of communications which take place between various components of the invention.

As illustrated in FIG. 6, the printer polling device 100 may periodically poll the spooling server 50. The interval of the polling can vary as desired and can be adjusted dynamically based upon such factors as traffic or requests for files. The polling request (query) 210 is preferably encrypted. Because the query 210 is directed to a specific spooling server 50, it is difficult for a third party to breach the system's security. The query 210 asks the spooling server 50 if it has a print job identified by the user (e.g., via a PIN or a job number). Once the spooling server 50 has received a request 210 from the printer polling device 100 for a print job that is stored at the spooling server 50, the spooling server 50 waits for the next query 210 from the printer polling device 100. Then, instead of its normal answer to the query of "NACK" (negative acknowledge) 220, the spooling server 50 answers "ACK" (acknowledge) 230 and transmits the print job to the destination printer 120.

Figure 11:
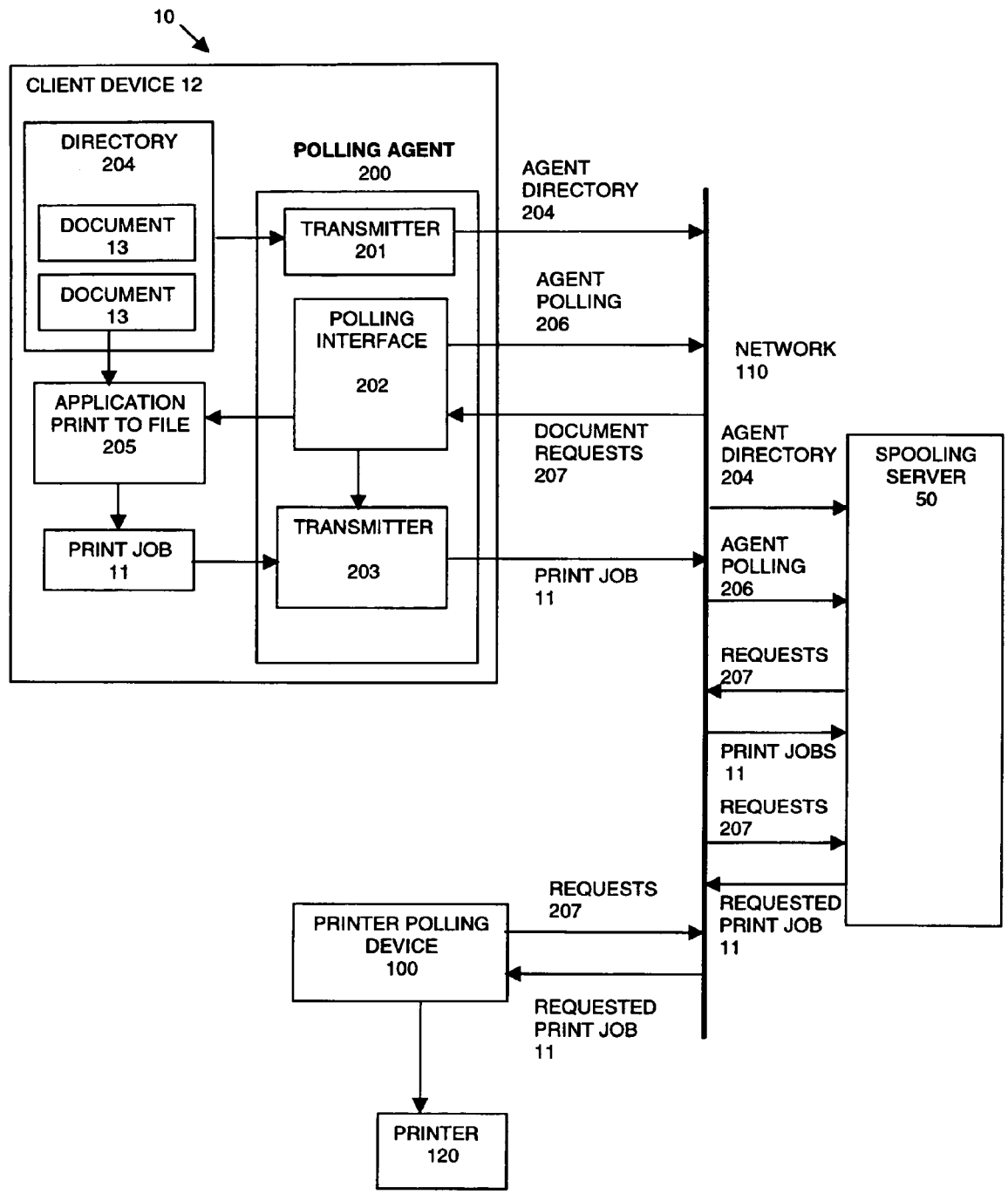
FIG. 11 is a block diagram of an embodiment of an agent program.

In an alternate embodiment as shown in FIG. 11, an agent program 200 provides a directory of documents 204 to the spooling server 50. The agent program 200 enables a client device 12 associated with the print job source 10 to poll the spooling server 50 to determine whether the spooling server 50 requires a document 13 identified in the directory 204 to complete a print job. If so, the document 13 can be uploaded from the client device 12 to the spooling server 50. The agent 200 enables a user at a printer 120 (or using any of the available interfaces to the spooling server 50) to initiate the printing of documents 13 that still reside on a client device 12 (such as the user's computer) even though the documents 13 have not been forwarded to the spooling server 50 as print jobs.

The agent program 200 may be downloaded and installed on the client device 12. The agent program 200 may be configured to make the contents of some or all of the directories 204 on the client device 12 available to the spooling server 50. Once installed and running, the agent program 200 initiates a connection to the spooling server 50 in the same way the printer polling device 100 does. The agent program may have a connection through a firewall, for example.

The directory of documents 204 may include application files such as a MicrosoftWord.doc file, for example, or files that have been made into a print job (Postscript or PDF file) by printing "to a file" from some application.

The directory 204 can be communicated to the printer polling device 100 and presented at the printer polling device 100. Selection of a print job 11 from the directory can be made (e.g., via a user interface).

For example, the spooling server 50 will list those documents 13 being available from the agent program 200 whenever the user of that account is interacting with the printer polling device 100, or any other interface provided for communication to the spooling server 50 as described herein.

For example, the agent program 200 may periodically poll the spooling server 50 via polling interface 202. The interval of the polling can vary as desired and can be adjusted dynamically based upon such factors as traffic or requests for files. The communications between the agent program 200 and the spooling server 50 occur substantially as described in connection with FIG. 6 above. The polling request (query) 206 is preferably encrypted. Because the query 206 is directed to a specific spooling server 50, it is difficult for a third party to breach the system's security. The query 206 asks the spooling server 50 if it wants any files in the directory 204 (and may also update the directory 204). Once the spooling server 50 has received a request 207 from the printer polling device 100 for a document that is listed in the directory 204, the spooling server 50 waits for the next query 206 from the agent program 200. Then, instead of its normal answer to the query of "NACK" (negative acknowledge), it answers "ACK" (acknowledge) followed by document information, such as the name of the document that is requested by request 207.

The agent program 200, upon receiving an "ACK" and the request information 207, opens the document 13 using the application it was created in and prints it to a temporary file 205 to create a print job 11. This print job 11 is then transmitted to the spooling server 50 via transmitter 203. The spooling server 50 uses its normal mechanism to then transmit the print job 11 to the destination printer 120.

Alternatively, the spooling server 50 may send an "ACK" followed by the name of a subdirectory. In that case, the agent program 200 returns the contents of that subdirectory. The spooling server 50 can then display those files to the user at the printer polling device 100 and allow one of the files to be selected, or allow additional navigation of directory 204 to take place.

The directory 204 may be presented via a visual presentation or an audio presentation. The client device 12 may periodically poll the spooling server 50 to determine whether the spooling server 50 requires a document from the directory 204 to complete a print job.

Communications with the spooling server 50 may be enabled via at least one of a telephone, a personal digital assistant device, a computer, an Internet appliance, a web browser, a dedicated terminal, or the like. The communications with the spooling server 50 may be via an audio interface or a visual interface.

A communication device for providing status of the print job stored on the spooling server 50 may be provided. The status of the print job may comprise at least one of filename, file size, author, creation date, print job lifetime, image, title, contents, personal identification number, recipient, job number, or reference number. The communication device may be a telephone, a computer, an Internet appliance, a personal digital assistant device, a dedicated terminal, or any other suitable wireless or wired communication device.

The print job source 10 may be one of a computer, a personal digital assistant device, an Internet appliance, a telephone, a facsimile machine, a scanner, a dedicated terminal, or other suitable source.

The printer polling device 100 may be capable of polling multiple spooling servers.

The spooling server 50 may be capable of communicating with other servers and receiving a print job from at least one of the other servers.

The print jobs submitted from the print job source 10 to the spooling server 50 may be generated in a page description language known as Postscript. Alternate choices for a page description language are PDF, Latex, or other similar languages. The size of the paper, various printer capabilities, and printable area dimensions may be assumed from a lowest common denominator set of capabilities common to most of the intended target printers.

Figure 7:
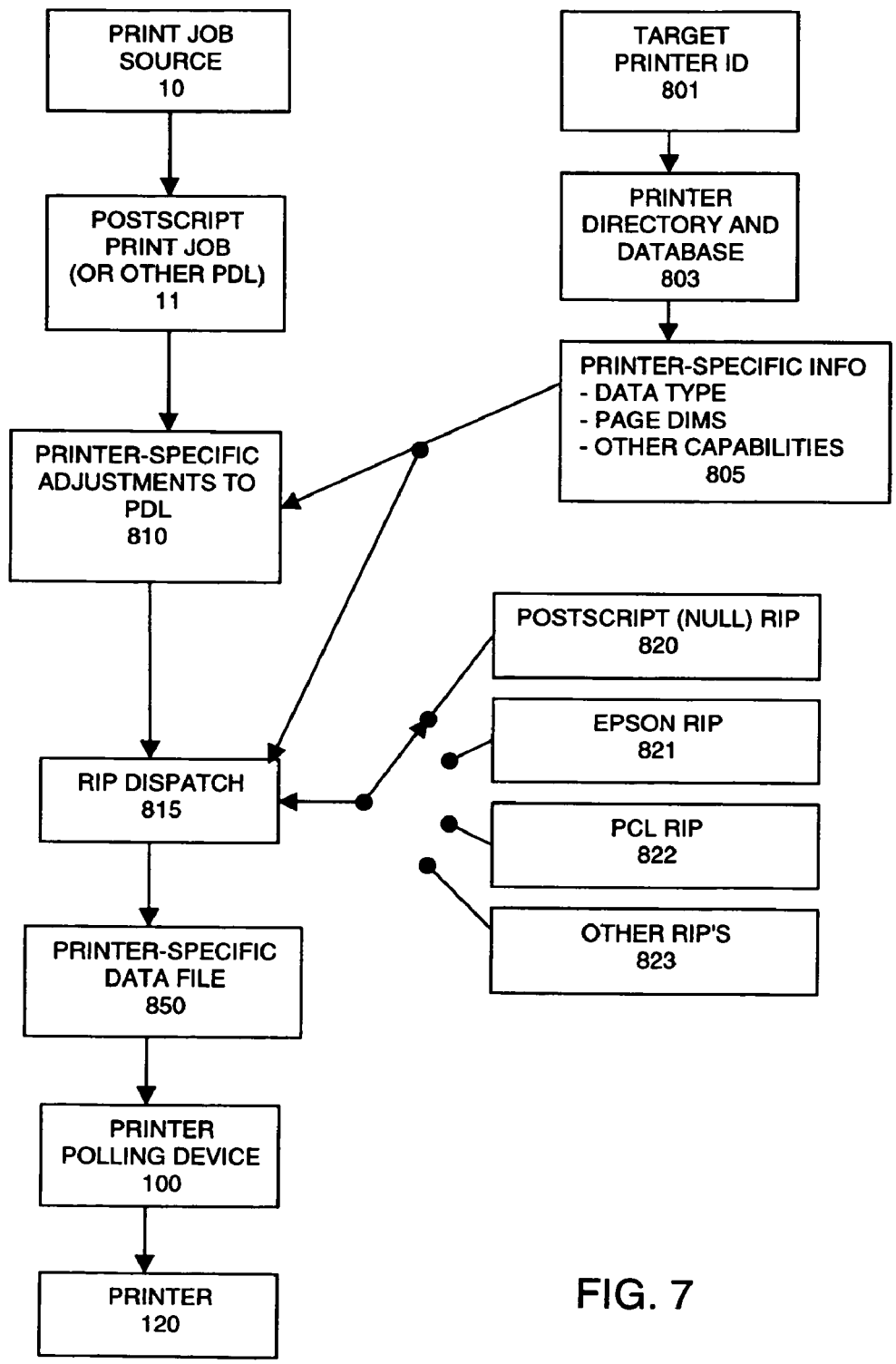
FIG. 7 is a flow chart illustrating an example print job reformatting routine.

Once the destination printer 120 is known, the page description language data needs to be converted into a form that can be understood by that printer 120. This process is shown in FIG. 7. Once the print job 11 is sent to the spooling server 50, a target printer 120 must be identified before the spooling server 50 can forward the print job 11 to be printed. Target printer identification 801 can be provided with the print job 11 from the print job source 10 or can be provided by the printer polling device 100 as part of the polling query. The spooling server 50 retrieves printer specific information 805 for the target printer 120 from a printer database 803. Based on the printer specific information 805 (such as data type, page dimensions, color capabilities, margins, and other print characteristics) the spooling server 50 will make printer specific adjustments 810 to the print job 11 at the page description language level prior to rasterization.

On printers that can accept Postscript (or the PDL of choice) directly, no modification is necessary. For other, simpler printers, a lower level bitmap form of the page is required to be sent to the printer. In this case, the page description language needs to be rasterized into a bitmap form. In addition, the bitmap data needs to be formatted into the form understood by the printer 120. A raster image processor 815 determines the target printer type from the printer specific information 805 and selects an appropriate data format from available formats 820, 821, 822, 823. The raster image processor 815 places the print job 11 into a printer specific data file 850 for delivery to the printer polling device 100 to be printed at the target printer 120.

One common example of a data format used with simple printers is PCL (Printer Control Language), which is widely used in printers built by Hewlett Packard. Other printers built by Epson, for example use Epson's proprietary Epson-escape code sequences to format the bitmap data.

Alternatively, reformatting of the print job may take place at the printer 120, at the printer polling device 100, or at any other suitable device.

Figure 8:
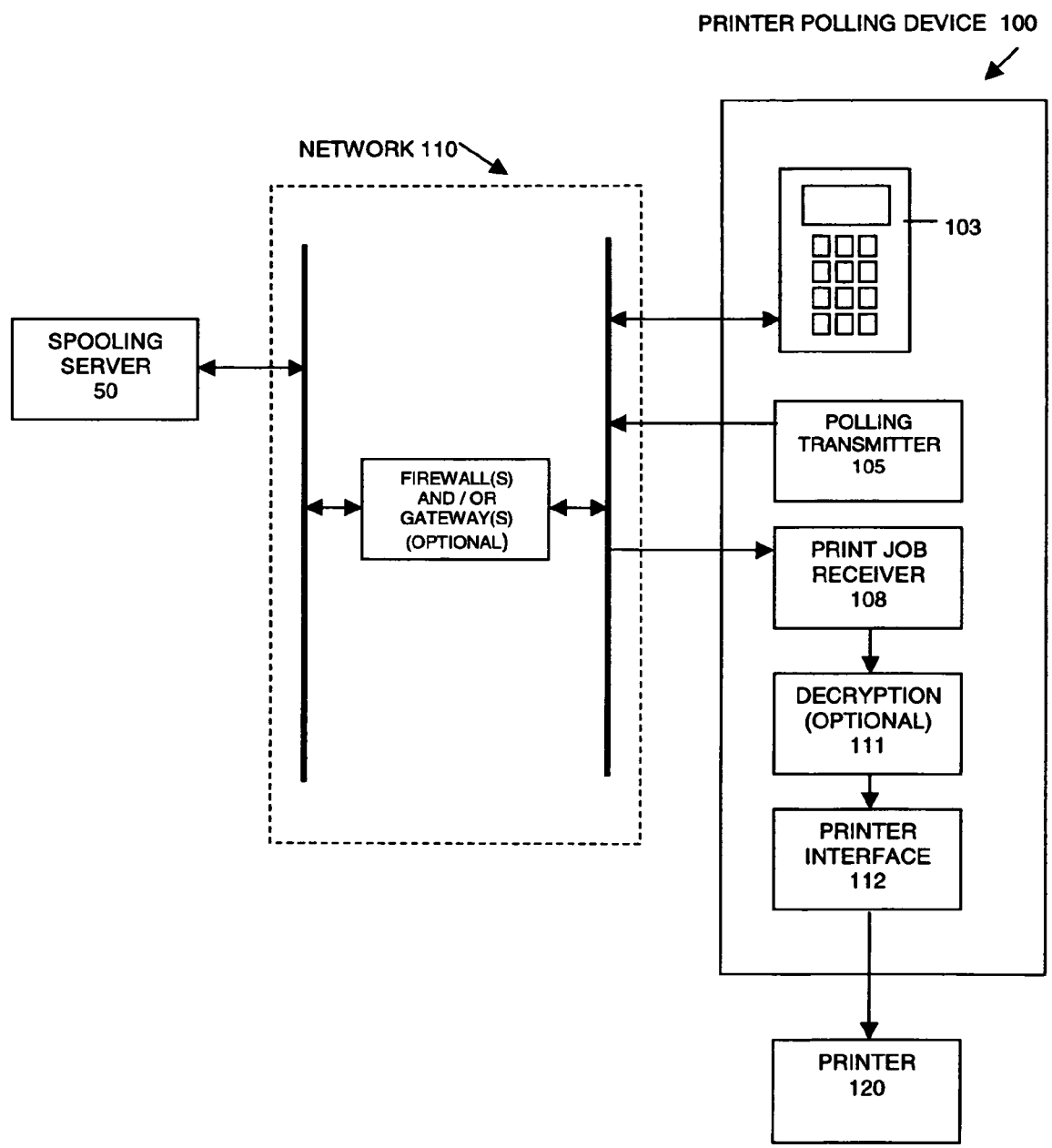
FIG. 8 is a block diagram of an embodiment of a printer polling device.

FIG. 8 shows the components of an embodiment of a printer polling device 100. As discussed above in connection with FIG. 3, the printer polling device may optionally include a user interface 103 for enabling communications with the spooling server 50 (e.g., providing a PIN to the spooling server 50). A polling transmitter 105 is provided for transmitting polling requests to the spooling server 50 via the network 110 to identify a print job stored at the spooling server 50 (as discussed in connection with FIGS. 1 and 4 above). A print job receiver 108 is provided for receiving the identified print job from the spooling server 50 via the network 110. Decryption 111 of an encrypted print job may optionally be provided for at the printer polling device 100. A printer interface 112 enables the printer polling device 100 to forward the print job to a printer 120 for printing.

Figure 9:
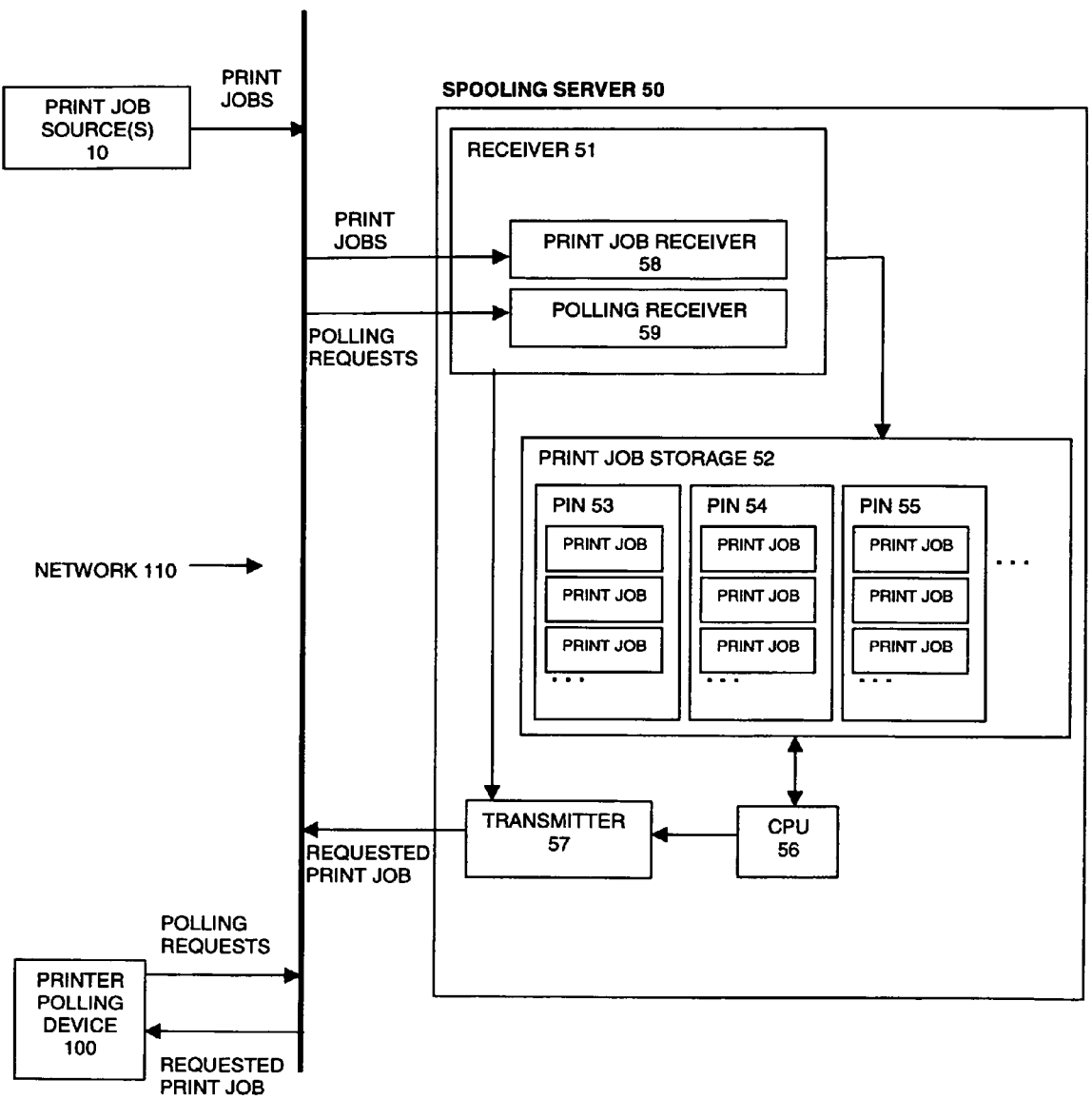
FIG. 9 is a block diagram of an embodiment of a spooling server.

FIG. 9 shows the components of an embodiment of a spooling server 50. A receiver 51 is provided which is capable of receiving print jobs from the print job source 10 and receiving polling requests from the printer polling device 100. The receiver 51 may comprise a print job receiver 58 for receiving the print job and a polling receiver 59 for receiving the polling request. When a print job is received by the receiver 51, the spooling server 50 stores the print job in memory 52, which may comprise random access memory (RAM), magnetic or optical storage media, or any other read/write memory device. As discussed herein, the print jobs may be stored in memory 52 according to a PIN. Multiple print jobs may be stored under each PIN as shown at 53, 54, and 55. When the spooling server 50 receives a polling request for a specific print job from the printer polling device 100 at the receiver 51, the spooling server 50 will determine whether the requested print job is stored in memory 52, and if so, forward the requested print job to the printer polling device 100 via transmitter 57. A processor 56 enables the spooling server to search for, retrieve, and/or reformat the print job for delivery to the printer polling device 100.

Figure 10:
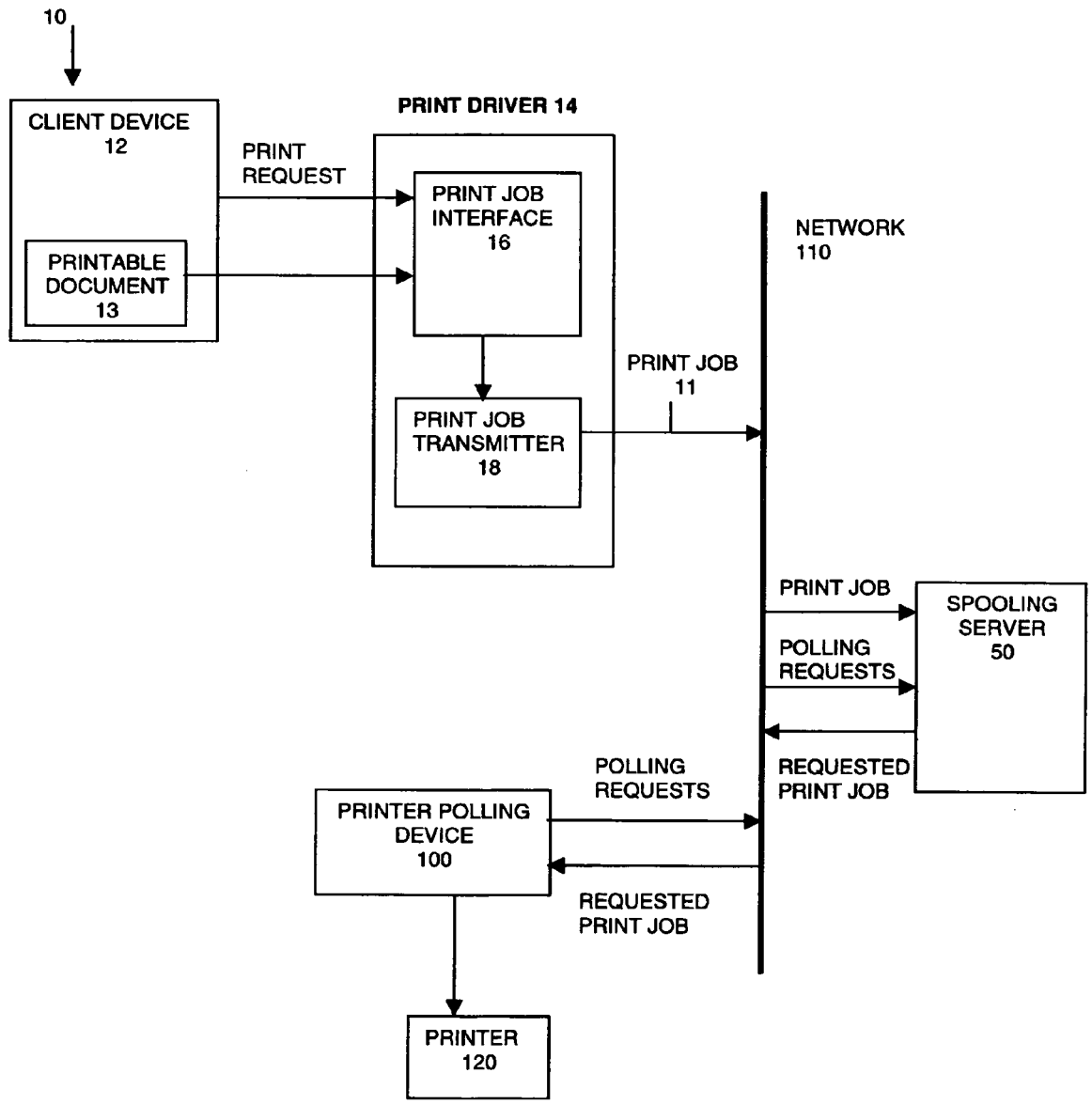
FIG. 10 is a block diagram of an embodiment of a print driver.

FIG. 10 shows the components of an embodiment of a print driver 14. An interface 16 is provided for receiving a print job from a print job source 10. The print job source 10 is shown in FIG. 10 as a client device 12, but can be any suitable print job source as discussed herein. The interface 16 receives a printable document 13 from the client device 12. A transmitter 18 is provided for transmitting the print job 11 to the spooling server 50 via the network 110. The spooling server 50 receives polling requests from the printer polling device 100 and forwards one or more identified print jobs to the printer polling device 100 in response to the polling requests. The print jobs can then be printed at a printer 120 associated with the printer polling device 100. As discussed in greater detail elsewhere herein, the printer polling device 100 does not have to identify specific print jobs to the spooling server 50. Instead, it can simply request a list of all print jobs (if any) currently stored at the spooling server 50 for that specific printer polling device 100, or for a particular PIN number (or other identifier) entered via the printer polling device 100 or other device. As discussed elsewhere herein, the list of print jobs may be accessed via various other devices capable of communicating with the spooling server 50.

It will now be appreciated that the present invention provides improved methods and apparatus for receiving, storing, and forwarding print jobs over a communications network in a secure manner without the need to specify the print destination. By using a printer polling device, the disadvantages of prior art push data flow techniques are overcome. Instead of having a remote device initiate contact with a print station behind a firewall, the present invention provides a spooling server that receives polling requests from a printer polling device to determine if there are any documents to be printed by a printer associated with the printer polling device. Compatibility with all types of printers is also provided.

Although the invention has been described in connection with preferred embodiments thereof, those skilled in the art will appreciate that numerous adaptations and modifications may be made thereto without departing from the scope of the invention, as set forth in the following claims.

The invention claimed is:

1. A network printing method comprising:
   forwarding a print job to a spooling server;
   initiating the print job at the spooling server for printing a document at a designated printer;
   automatically sending to the spooling server a polling request for any initiated print jobs from a printer polling device associated with the designated printer; and
   forwarding the requested initiated print job from the spooling server to the printer polling device in response to the polling request.

2. The method of claim 1, wherein forwarding comprises forwarding the print job to the spooling server without a predetermined print destination.

3. The method of claim 1, wherein the printer polling device periodically polls the spooling server to identify print jobs associated with the printer polling device.

4. The method of claim 1, wherein the network comprises at least one of a local area network, a wide area network, a global network, and the Internet.

5. The method of claim 1, wherein:
   the printer polling device is located within a gateway firewall; and
   the spooling server is located outside the gateway firewall.

6. The method of claim 5, wherein forwarding comprises forwarding the print job to the spooling server without requiring reconfiguration of the gateway firewall.

7. The method of claim 1, wherein:
   a print job source is located at and in communication with a first local area network and forwards the print job to the spooling server;
   the printer polling device is located at and in communication with a second local area network; and
   the spooling server is located outside of the first and second local area networks.

8. The method of claim 7, wherein:
   the print job source communicates with the spooling server via a first gateway firewall which controls access to the first local area network; and
   the printer polling device communicates with the spooling server via a second gateway firewall which controls access to the second local area network.

9. The method of claim 1, further comprising designating a recipients of the print job, wherein the print job can only be printed by the designated recipient.

10. The method of claim 1, wherein a print job source is one of a computer, a personal digital assistant device, an Internet appliance, a facsimile machine, a scanner, a telephone, or a dedicated terminal.

11. A spooling server for network printing, the apparatus comprising:
    a receiver for receiving a print job at the spooling server;
    a processor for initiating the print job for printing a document at a designated printing device;
    a transmitter for forwarding the initiated print job from the spooling server to a printer polling device associated with the designated printer in response to a polling request for any initiated print jobs at the spooling server from the printer polling device, the polling request being automatically forwarded from the printer polling device to the spooling server.

12. The spooling server of claim 11, wherein the print job is forwarded to the spooling server without a pre-determined print destination.

13. The spooling server of claim 11, wherein the printer polling device periodically polls the spooling server to identify print jobs associated with the printer polling device.

14. The spooling server of claim 11, wherein the network comprises at least one of a local area network, a wide area network, a global network, and the Internet.

15. The spooling server of claim 11, wherein:
    the printer polling device is located within a gateway firewall; and
    the spooling server is located outside the gateway firewall.

16. The spooling server of claim 15, wherein the print job is forwarded to the spooling server such that reconfiguration of the gateway firewall is not required.

17. The spooling server of claim 11, wherein:
    a print job source is located at and in communication with a first local area network and forwards the print job to the spooling server;
    the printer polling device is located at and in communication with a second local area network; and
    the spooling server is located outside of the first and second local area networks.

18. The spooling server of claim 17, wherein:
    the print job source communicates with the spooling server via a first gateway firewall which controls access to the first local area network; and
    the printer polling device communicates with the spooling server via a second gateway firewall which controls access to the second local area network.

19. The spooling server of claim 11, wherein: one or more recipients of the print job are designated, wherein the print job can only be printed by the designated one or more recipients.

20. The spooling server of claim 11, wherein a print job source is one of a computer, a personal digital assistant device, an Internet appliance, a facsimile machine, a scanner, a telephone, or a dedicated terminal.

* * * * *